United States Patent
Jeong et al.

(10) Patent No.: US 12,115,991 B2
(45) Date of Patent: Oct. 15, 2024

(54) PREDICTIVE TRACTION CONTROL SYSTEM OF VEHICLE BASED ON ROAD SURFACE INFORMATION AND PREDICTIVE TRACTION CONTROL METHOD

(71) Applicants: HYUNDAI MOTOR COMPANY, Seoul (KR); KIA CORPORATION, Seoul (KR)

(72) Inventors: Jong Yun Jeong, Hwaseong-si (KR); Sung Keun Lim, Hwaseong-si (KR); Sun Young Lee, Goyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 61 days.

(21) Appl. No.: 17/678,553

(22) Filed: Feb. 23, 2022

(65) Prior Publication Data

US 2023/0125472 A1    Apr. 27, 2023

(30) Foreign Application Priority Data

Oct. 22, 2021    (KR) .................. 10-2021-0141716

(51) Int. Cl.
*B60W 30/18*    (2012.01)
*B60W 40/068*    (2012.01)
(Continued)

(52) U.S. Cl.
CPC .... *B60W 30/18172* (2013.01); *B60W 40/068* (2013.01); *B60W 50/0097* (2013.01); *B60W 2420/403* (2013.01); *B60W 2420/408* (2024.01); *B60W 2510/081* (2013.01); *B60W 2520/10* (2013.01); *B60W 2520/105* (2013.01); *B60W 2520/14* (2013.01); *B60W 2540/10* (2013.01); *B60W 2540/12* (2013.01); *B60W 2552/40* (2020.02); *B60W 2555/20* (2020.02); *B60W 2556/45* (2020.02); *B60W 2710/081* (2013.01);

(Continued)

(58) Field of Classification Search
None
See application file for complete search history.

(56) References Cited

U.S. PATENT DOCUMENTS 10,144,293 B2 * 12/2018 Suzuki .................... B60T 8/175
11,535,259 B2 * 12/2022 Lellmann .............. B60W 30/00
(Continued)

FOREIGN PATENT DOCUMENTS

KR    10-2021-0044917 A    4/2021

*Primary Examiner* — Todd Melton
(74) *Attorney, Agent, or Firm* — MORGAN, LEWIS & BOCKIUS LLP

(57) ABSTRACT

A predictive traction control system may include: a road surface conditions information providing unit mounted on a vehicle driven by a driving motor, to detect and output an upstream road surface condition in a travelling direction of the vehicle; and a predictive control unit electrically connected to the road surface conditions information providing unit, determining an entry or release of the predictive traction control using information on road surface conditions input from the road surface conditions information providing unit, and calculating target driving motor speed for controlling the driving motor and transmitting the same.

5 Claims, 3 Drawing Sheets

(51) Int. Cl.
*B60W 50/00* (2006.01)
*G06V 20/56* (2022.01)
(52) U.S. Cl.
CPC . *B60W 2710/083* (2013.01); *B60W 2720/106* (2013.01); *G06V 20/588* (2022.01)

(56) References Cited

U.S. PATENT DOCUMENTS

2017/0166216 A1* 6/2017 Rander ............... B60W 30/182
2021/0107456 A1 4/2021 Kim
2023/0041291 A1* 2/2023 Eriksson ......... B60W 30/18172

* cited by examiner

FIG. 3A — RELATED ART —

PREDICTIVE TRACTION CONTROL SYSTEM OF VEHICLE BASED ON ROAD SURFACE INFORMATION AND PREDICTIVE TRACTION CONTROL METHOD

CROSS-REFERENCE TO RELATED APPLICATION(S)

This application claims benefit of priority to Korean Patent Application No. 10-2021-0141716 filed on Oct. 22, 2021 in the Korean Intellectual Property Office, the disclosure of which is incorporated herein by reference in its entirety.

TECHNICAL FIELD

The present disclosure relates to a predictive traction control system that enables a vehicle to run linearly without wheel spin, by performing traction control in advance when a driver accelerates, using road surface information, and a predictive traction control method.

BACKGROUND

Various types of electric vehicles are being developed. For example, there are electric vehicles in which one motor is used for a front wheel axle or a rear wheel axle, one motor is used for each of the front wheel axle and the rear wheel axle, three motors, such as one on the front wheel axle and one on each wheel on the rear wheel axle, are used, or motors individually mounted on all wheels are used.

Unlike internal combustion engine vehicles, such electric vehicles have an advantage enabling rapid response according to the driver's will to accelerate by utilizing unique characteristics of motors generating the greatest output (torque) in a mid-to-high speed region (about 60 to 80 km/h) after departure.

However, when the road surface is slippery due to rain, snow, freezing, etc., output of the motor may exceed a torque limit generated by a road surface and a tire, and the vehicle may become unstable. In particular, when the motor is mounted on a rear wheel axle or a rear wheel, a tendency of the vehicle to become unstable more easily is noticeable. In this case, traction control of the vehicle plays a very important role.

In conventional electric vehicles, wheel spin occurs when a driver applies an amount of driving torque above a road-tire torque limit on a slippery road surface, and only when the wheel spin exceeds a predetermined reference value, does a traction controller send a command to control a driving torque to stabilize the wheel. Eventually, the traction controller will enter control after a situation has occurred.

Such traction control can control an entry point thereof, but large amount of wheel spin inevitably occurs at the beginning of acceleration, and it is almost impossible to drive at a road-tire torque limit level without wheel spin.

The above descriptions regarding background technologies have been made only for enhancement of understanding of the background of the present disclosure, and are not to be deemed by those skilled in the art to correspond to already-know related arts, and should not be taken as acknowledgment that this information forms any part of related art.

SUMMARY

An aspect of the present disclosure is to provide a predictive traction control system and a predictive traction control method that enable a vehicle to run linearly without wheel spin, by performing traction control in advance when a driver accelerates by utilizing road surface information.

According to an aspect of the present disclosure, a predictive traction control system may include: a road surface conditions information providing unit to be mounted on a vehicle driven by a driving motor, to detect and output an upstream road surface condition in a travelling direction of the vehicle; and a predictive control unit electrically connected to the road surface conditions information providing unit, determining an entry or release of predictive traction control using information on the upstream road surface condition inputted from the road surface conditions information providing unit, and calculating target driving motor speed for controlling the driving motor and transmitting the same.

The road surface conditions information providing unit may include at least one of a camera, a thermal imaging camera, an RGB camera, a lidar sensor, and a photodetector.

The road surface conditions information providing unit may further include a temperature sensor and a humidity sensor, and the road surface conditions information providing unit may be configured to estimate road surface conditions based on the sensed weather information.

The road surface conditions information providing unit may be configured to obtain information on a road surface from an external server through a navigation module or a communication module.

The predictive traction control system may further include a vehicle state providing unit electrically connected to the predictive control unit and providing information on a driving state of the vehicle.

The vehicle state providing unit may include a wheel speed sensor, an accelerator pedal sensor, a brake pedal sensor, an acceleration sensor, and a yaw rate sensor, to be mounted on the vehicle.

The predictive control unit may include a timer, and may obtain time data from the timer.

The predictive traction control system may further include: a target driving motor torque calculating unit receiving the target driving motor speed from the predictive control unit, and calculating target driving motor torque and transmitting the same; and a driving motor control unit receiving the target driving motor torque from the target driving motor torque calculating unit, and controlling a current applied to the driving motor.

According to an aspect of the present disclosure, a predictive traction control method, may include: detecting, by a road surface conditions information providing unit, upstream road surface conditions in a travelling direction of a vehicle driven by a driving motor; determining, by a predictive control unit, whether to accelerate the vehicle according to a driver's will when the upstream road surface condition is determined to be slippery; and calculating, by the predictive control unit, target driving motor speed for controlling the driving motor and transmitting the same, when the vehicle is accelerating.

The predictive traction control method may further include determining, by the predictive control unit, whether predictive traction control is being performed before the detecting of the upstream road surface condition, wherein when it is determined, by the predictive control unit, that predictive traction control has not been entered, the detecting of the upstream road surface condition may be performed.

The detecting of the upstream road surface condition may include at least one of detecting, by the road surface conditions information providing unit, the upstream road surface condition through a camera or a sensor, estimating, by the road surface conditions information providing unit, the upstream road surface condition based on sensed weather information, and obtaining, by a navigation or a communication module, information of the road surface from an external server.

The determining of whether to accelerate a vehicle according to the driver's will may include confirming, by the predictive control unit, the driver's will to accelerate from a signal of an accelerator pedal sensor or a brake pedal sensor of the vehicle.

The calculating and transmitting of the target driving motor speed may include calculating, by the predictive control unit, a target vehicle speed corresponding to information on a speed of the vehicle, an opening degree of an accelerator pedal, a torque increase rate for each driving mode, and a distribution ratio for each driving motor; and calculating, by the predictive control unit, the target driving motor speed to which a reduction ratio and a speed reducer efficiency are reflected based on the target vehicle speed.

The predictive traction control method may further include utilizing, by a target driving motor torque calculating unit, the target driving motor speed to calculate a target driving motor torque for controlling the driving motor, and controlling, by a driving motor control unit, based on the calculated target driving motor torque, a current applied to the driving motor.

The predictive traction control method may be terminated, by the predictive control unit, when a driver depresses an accelerator pedal so that an opening degree of the accelerator pedal is smaller than a predetermined reference value, when predictive traction control is performed to a specific time or longer, or when the existing traction control attempts to enter traction control.

BRIEF DESCRIPTION OF DRAWINGS

The above and other aspects, features, and advantages of the present disclosure will be more clearly understood from the following detailed description, taken in conjunction with the accompanying drawings, in which:

FIG. 3A is a graph illustrating a torque and wheel speed of a driving motor according to time during traction control according to the related art.

DETAILED DESCRIPTION

Figure 1:
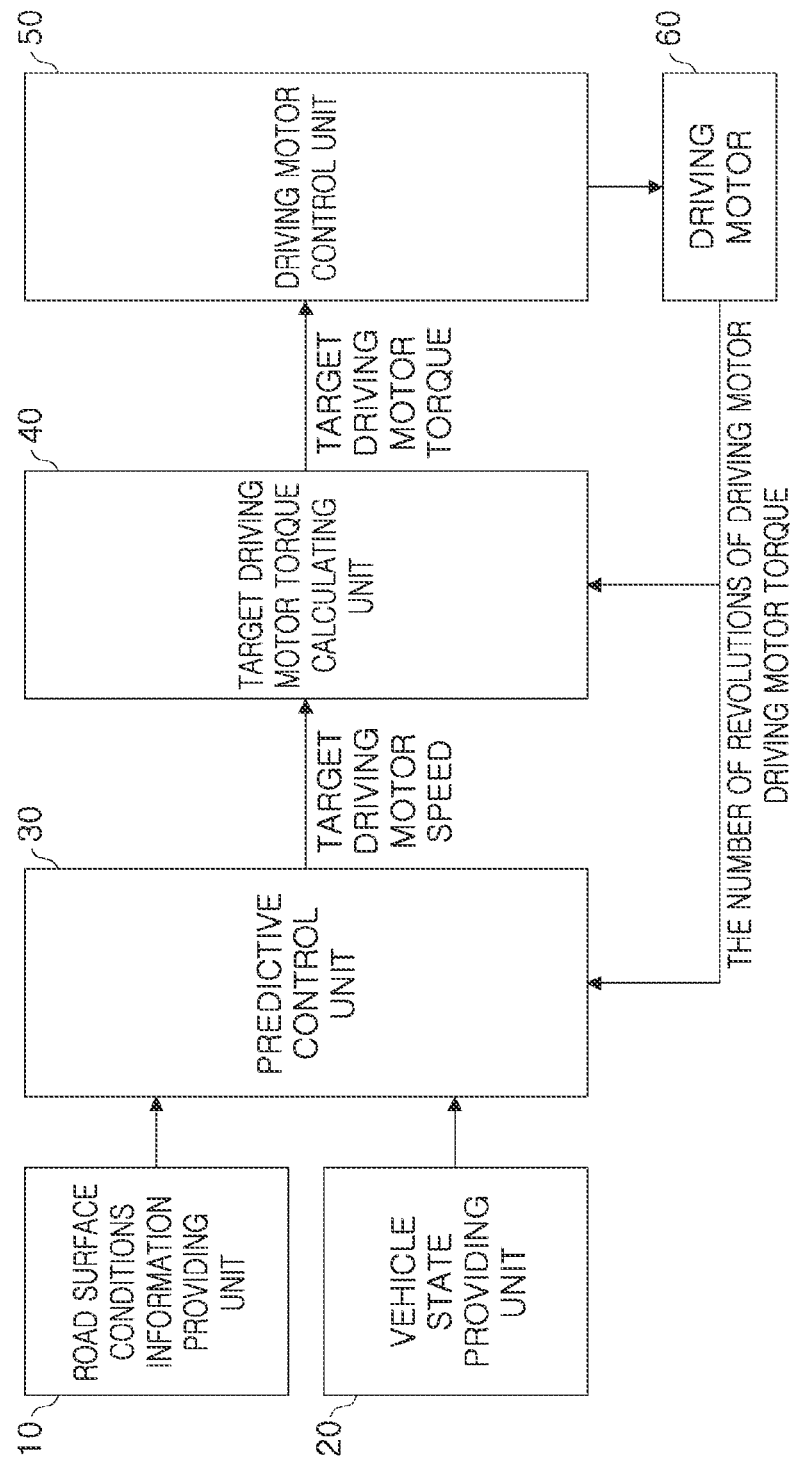
FIG. 1 is a schematic configuration diagram of a predictive traction control system according to the present disclosure.

Hereinafter, embodiments in the present disclosure will be described hereinafter with reference to the accompanying drawings. The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. In the drawings, the same reference numerals will be used throughout to designate the same or like elements, and the shapes and dimensions of elements may be exaggerated for clarity.

In the present specification, a vehicle refers to various vehicles moving a transported object such as a person, an animal, or an object from a departure point to a destination.

However, the vehicle may be any one of an electric vehicle that includes a rechargeable battery and a driving motor, rotates the driving motor with electricity accumulated in the battery, and drives wheels using the rotation of the driving motor; a hybrid vehicle that includes an engine, a battery, and a driving motor, and drives by controlling mechanical power of the engine and electrical power of the driving motor; and a hydrogen fuel cell vehicle that reacts hydrogen with oxygen in the air, charges a battery using electricity generated at this time, and rotates a driving motor using the charged battery power.

The vehicle may include a vehicle body, wheels disposed on front, rear, left and right sides of the vehicle body, a power device for applying a driving force to at least some wheels, a steering device, a braking device for applying a braking force to the wheels, a suspension device, and the like.

The power device may include a battery, a driving motor, a power converter, a speed reducer, and the like.

The battery supplies power to the drive motor. The battery may be charged by receiving power from an external power source through a plug inserted into a charging port, or a battery such as a hydrogen fuel cell may generate power and supply the generated power to the driving motor.

The driving motor generates a driving force for rotating the wheel or axle, and transmits the generated driving force to the speed reducer. In an energy regeneration condition, the driving motor may operate as a generator by a rotational force transmitted through the wheels to charge the battery.

The power converter may convert power of the battery into driving power required for driving the driving motor. Also, the power converter may change a direction and an output of a current between the driving motor and the battery.

The speed reducer converts a rotational speed (RPM) of the driving motor so that a traveling speed of the vehicle reaches a target vehicle speed. That is, the speed reducer generates a driving force corresponding to the converted number of revolutions of the driving motor and transmits the generated driving force to the wheel or axle.

The vehicle may include an accelerator pedal pressed by a driver's foot according to a driver's will to accelerate, a brake pedal pressed by the driver's foot according to a driver's braking will, and a steering wheel of a steering device for adjusting a travelling direction.

In addition, various safety devices are provided in the vehicle for the safety of the driver or passengers. Thereamong, there is a traction control system controlling the driving force of a vehicle to prevent wheel spin when starting to move or accelerating on a road surface with low frictional force, such as on a rainy, snowy, icy road, or the like.

The units and modules disclosed herein may each include memory configured to store algorithm configured to control the operation of the units and modules or data relating to software instructions for reproducing the algorithm, and a processor configured to perform operations described below using data stored in the corresponding memory. The processor may take the form of one or more processors.

FIG. 1 is a schematic configuration diagram of a predictive traction control system according to the present disclosure. As shown, the predictive traction control system according to the present disclosure may include a road surface conditions information providing unit 10 and a predictive control unit 30.

The road surface conditions information providing unit 10 may be mounted on a vehicle to detect an upstream road surface condition in a traveling direction of the vehicle. In other words, when the vehicle moves forward, a front surface in front of the vehicle may be monitored. In the present specification, for convenience of description, the upstream road surface condition in the traveling direction of the vehicle will be abbreviated as the "front" side road surface condition of the vehicle.

Since the road surface conditions information providing unit 10 is mounted on the vehicle, when the vehicle is travelling, the road surface conditions information providing unit 10 may detect road surface conditions of the front side of the vehicle while driving and output the same.

The road surface conditions information providing unit 10 may include, for example, at least one of a camera, a thermal imaging camera, an RGB camera, a light detection and ranging (LIDAR) sensor, and a photodetector. The road surface conditions information providing unit may detect road surface conditions using at least one of these cameras and sensors.

For example, a camera, a thermal imaging camera, an RGB camera, or the like, may confirm the presence or absence of water, snow, freezing, or the like, on a road surface through image processing. As another example, the presence or absence of water, snow, freezing, or the like, as well as the presence or absence of curvatures or irregularities of the road surface, and the shape thereof may be confirmed from the road surface by using a lidar sensor or a photodetector.

To this end, the road surface conditions information providing unit 10 may include an image processing module, and may perform an algorithm for determining road surface conditions by using an image of the road surface collected by the camera and determine road surface conditions. For example, the image processing module may classify the road surface, determine whether the road surface is good or bad, and store the image and data of the road surface.

For example, road surface conditions can be determined from a polarized image obtained by using a polarization filter on a camera, or a wavelet packet algorithm may be applied to the obtained image to convert the same into frequency data, then extract a specific frequency component and determine road surface conditions. Since this determination method is a known technique in a field of image processing, a detailed description thereof will be omitted.

The road surface conditions information providing unit 10 may further include a temperature sensor and a humidity sensor. The road surface conditions information providing unit may estimate road surface conditions based on the sensed weather information.

For example, by confirming an air temperature with the temperature sensor, it is possible to determine whether the air temperature is below zero. That is, it can be determined whether the air temperature is lower than 0° C.

When it is determined that the air temperature is below zero, relative humidity can be confirmed by the humidity sensor. It is possible to compare the relative humidity with a preset threshold and determine whether the relative humidity exceeds the threshold. For example, the threshold may be 70%.

If the presence of water or snow on the road surface is confirmed by a camera, a sensor, or the like, and the air temperature is below zero and the relative humidity exceeds a threshold, freezing may exist on the road surface.

In addition, the road surface conditions information providing unit 10 may include a navigation or a communication module. The road surface conditions information providing unit may obtain information on the road surface including a known freezing section from the navigation. The road surface conditions information providing unit may accumulate information on the road surface including the known freezing section for a road by using a learning result obtained through learning by the navigation in advance.

Alternatively, the road surface conditions information providing unit 10 may receive information on a road surface including a known freezing section along with weather information such as weather conditions including rain or snow, humidity, a probability of precipitation, and the like, from an external server in real time through a communication module.

The road surface conditions information providing unit 10 may output information regarding the detected road surface condition on a front side of the vehicle to the prediction control unit 30.

Here, the information on road surface conditions is information on whether factors affecting a change in frictional force between the road surface and a tire exist on the road surface. For example, information on an amount of water or snow on the road surface, information on freezing on the road surface, and the like may be included.

The predictive traction control system according to the present disclosure may further include a vehicle state providing unit 20 providing information on a driving state of a vehicle.

The vehicle state providing unit 20 may include a wheel speed sensor, an accelerator pedal sensor, a brake pedal sensor, an acceleration sensor, and a yaw rate sensor mounted on the vehicle.

The wheel speed sensor may be installed on each wheel to detect a rotational speed (angular velocity) of the wheel.

A driver's will to accelerate or brake may be determined by the accelerator pedal sensor or the brake pedal sensor. For example, when an opening degree of the accelerator pedal is equal to or greater than a first reference value, it may be determined that predetermined pedal force is applied to the accelerator pedal according to the driver's will to accelerate. The brake pedal sensor may at least detect whether the brake pedal is operated.

The acceleration sensor measures acceleration of the vehicle, and may include a lateral acceleration sensor and a longitudinal acceleration sensor. The lateral acceleration sensor may measure acceleration in a lateral direction when a direction perpendicular to a traveling direction of the vehicle is referred to as the lateral direction. The longitudinal acceleration sensor may measure acceleration in a traveling direction of the vehicle.

Such an acceleration sensor is an element detecting a change in speed per unit time, and detects dynamic forces such as acceleration, vibration, shock, and the like, and measures it using the principles of inertial force, electric deformation, and gyro.

The yaw rate sensor may be installed in a vehicle to detect a yaw rate value in real time. The yaw rate sensor has a celcium crystal element inside the sensor, and when the vehicle rotates while moving, the celcium crystal element itself rotates and generates a voltage. The yaw rate of the vehicle may be detected based on the voltage generated in this way.

For example, a yaw rate sensor, a lateral acceleration sensor, and a longitudinal acceleration sensor may be installed as one sensor module in a sensor cluster of a vehicle.

In addition, the predictive traction control system according to the present disclosure may perform predictive traction control by utilizing torque and the number of revolutions of the driving motor 60 obtained through a driving motor control unit 50 to be described later.

The vehicle state providing unit 20 may output information about a driving state of the vehicle detected from the sensors of the vehicle to the predictive control unit 30.

Here, the information on the vehicle state is information on a state of the vehicle in which it is possible to determine a change in frictional force between a road surface and a tire.

The predictive control unit 30 may be electrically connected to the road surface conditions information providing unit 10 or through a communication network of the vehicle. The predictive control unit may determine an entry or release of the predictive traction control using information on the road surface input from the road surface conditions information providing unit, and calculate target driving motor speed for controlling the driving motor 60 to transmit the same.

The predictive control unit 30 may be electrically connected to the vehicle state providing unit 20 or through a communication network of the vehicle for predictive traction control in a vehicle driven by the driving motor 60. The predictive control unit may calculate a target vehicle speed and target driving motor speed, by using information of a vehicle state input from the vehicle state providing unit, that is, each wheel speed, a signal of an accelerator pedal sensor or a brake pedal sensor, acceleration, and the like.

More specifically, the predictive control unit 30 may determine an entry of predictive traction control by using the input information. For example, when the presence of water or snow on the road surface is confirmed by a camera, a sensor, or the like, and an air temperature is below zero and relative humidity exceeds a threshold, the predictive control unit may determine that the road surface is slippery due to the presence of freezing on the road surface.

When it is determined that the road surface is slippery, the predictive controller 30 may determine a driver's will to accelerate or brake. The driver's will to accelerate can be confirmed from a signal of the accelerator pedal sensor or the brake pedal sensor.

When the driver's will to accelerate is confirmed, the predictive control unit 30 may enter predictive traction control, calculate a target vehicle speed, and calculate target driving motor speed based on the target vehicle speed and output the same.

The predictive control unit 30 may include a timer, and time data can be obtained from the timer. For example, after a predetermined time has elapsed, the predictive control unit may release predictive traction control when a release condition is satisfied.

The predictive control unit 30 may be applied to a single controller or another controller capable of receiving an input signal. In addition, the predictive control unit may be incorporated into or used in combination with an electronic control unit (ECU) of the vehicle.

The predictive traction control system according to the present disclosure may further include a target driving motor torque calculating unit 40 and a driving motor control unit 50 for controlling a driving motor 60.

The target driving motor torque calculating unit 40 may receive target driving motor speed from the prediction control unit 30, and calculate target driving motor torque through feedback control, feedforward control, or the like, and transmit the same.

For example, the target driving motor torque calculating unit 40 may calculate the target driving motor torque by proportional integral control (PI control) as in Equation 1 below, by using the target driving motor speed and a current driving motor speed, and output the same.

Target driving motor torque=(Target driving motor speed−Current driving motor speed)×Gain1+∫(Target driving motor speed−Current driving motor speed)$dt$×Gain2    [Equation 1]

However, a method by which the target driving motor torque calculating unit 40 calculates the target driving motor torque from the target driving motor speed is not necessarily limited thereto.

The driving motor control unit 50 may receive target driving motor torque from the target driving motor torque calculating unit 40, and may control a current applied to the driving motor 60 to satisfy the target driving motor torque.

Figure 2:
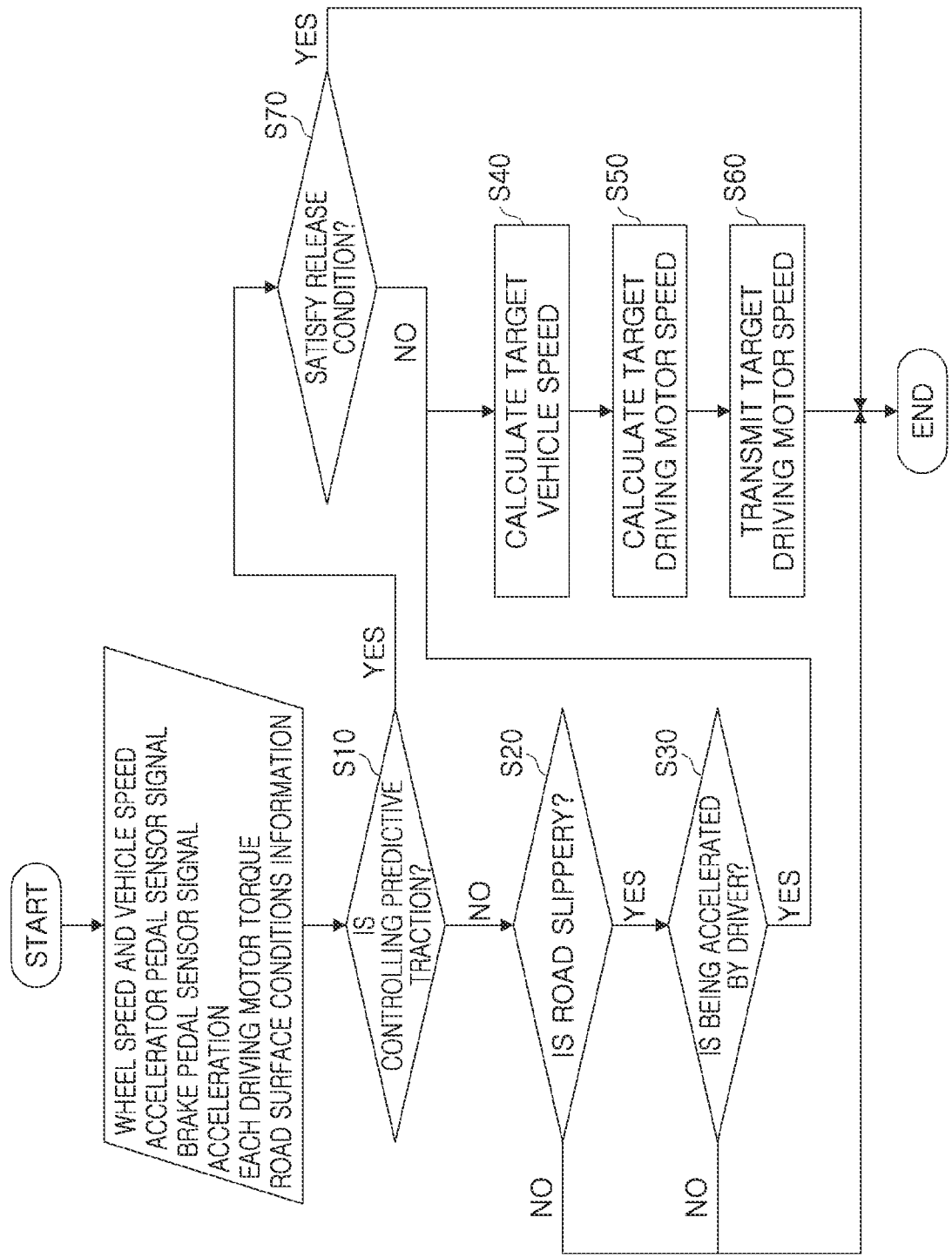
FIG. 2 is a flowchart of a predictive traction control method according to the present disclosure.

FIG. 2 is a flowchart of a predictive traction control method according to the present disclosure.

A vehicle state providing unit 20 may recognize a departure of a vehicle by an input of a start button, and receive information necessary for predictive traction control.

The vehicle state providing unit 20 may detect a rotational speed (angular velocity) of each wheel from, for example, a wheel speed sensor, and confirm a driver's will to accelerate or brake by an accelerator pedal sensor or a brake pedal sensor. An acceleration sensor may measure acceleration of the vehicle, and a yaw rate sensor may detect a yaw rate value in real time.

The vehicle state providing unit 20 may calculate a speed of a vehicle, where, the speed of the vehicle means a speed of the vehicle in a travelling direction, and may be used as a reference value for calculating target driving motor speed. The vehicle speed information may be calculated by using at least one of information such as each wheel speed, acceleration of the vehicle, a GPS signal, and the like.

In addition, the road surface conditions information providing unit 10 may detect road surface conditions on a front side of the vehicle and output the same.

The road surface conditions information providing unit 10 may confirm the presence or absence of water, snow, freezing, or the like on the road surface through an image obtained from, for example, a camera, a thermal imaging camera, an RGB camera, and the like.

As another example, the presence or absence of water, snow, freezing, or the like, as well as the presence or absence of curvatures or irregularities of the road surface, and the shape thereof may be confirmed from the road surface by using a lidar sensor or a photodetector.

Also, the road surface conditions information providing unit 10 may estimate road surface conditions based on the sensed weather information. The road surface conditions information providing unit may obtain information on a road surface including a known freezing section from a navigation, or may receive information on the road surface including a known freezing section together with weather information such as weather conditions including rain or snow, humidity, and probability of precipitation in real time from an external server by a communication module.

It is determined whether a host controller or another controller (not shown) is performing predictive traction control of a predictive control unit (step S10). For example, by confirming a flag related to the predictive traction control, it is possible to determine whether the predictive traction control is entered.

If it is determined that the predictive traction control has not been entered, the predictive control unit 30 may determine an entry of the predictive traction control by utilizing information on a driving state of a vehicle input from the vehicle state providing unit 20, and information on a road surface state on a front side of the vehicle input from the road surface conditions information providing unit 10.

In order to determine the entry of the predictive traction control, when an air temperature is below zero, and relative humidity exceeds a threshold value, in addition that the presence of water or snow on a road surface is confirmed by a camera, a sensor, or the like, the predictive control unit 30 may determine that the road surface is slippery due to the present of freezing on the road surface (step S20).

Alternatively, when the presence of water on the road surface is confirmed by a camera, a sensor, or the like, an air temperature is 0° C. or higher, and relative humidity exceeds a threshold, the predictive control unit 30 may determine that the road surface is wet and the road surface is slippery.

A criterion for determining whether the road surface is slippery may be changed based on season and weather information of a main driving region or sales region of the vehicle.

When it is determined that the road surface is in a slippery state, the prediction control unit 30 may determine whether the vehicle is accelerated according to a driver's will to accelerate or brake (step S30). The driver's will to accelerate can be confirmed from a signal from an accelerator pedal sensor or a brake pedal sensor.

For example, when an opening degree of the accelerator pedal detected by the accelerator pedal sensor is equal to or greater than a first reference value, it may be determined that a predetermined pedal force is applied to the accelerator pedal according to the driver's will to accelerate.

The first reference value may be determined at a level at which the driver's will to accelerate is clearly determined, and may be changed according to the number of driving motors 60 of the vehicle, an output of each driving motor, and the like.

The brake pedal sensor may at least detect whether the brake pedal is operated, and when the brake pedal is operated, it is determined that the driver has no will to accelerate.

When it is confirmed that the vehicle is being accelerated according to the driver's will to accelerate, the predictive control unit 30 determines that a condition required for entering the predictive traction control is satisfied and enters the predictive traction control.

In the predictive traction control, a target vehicle speed is calculated corresponding to information such as vehicle speed information, an opening degree of the accelerator pedal, a torque increase rate for each driving mode, a distribution ratio for each driving motor, and the like. Based on the target vehicle speed, a target driving motor speed to which a reduction ratio, a speed reducer efficiency, and the like are reflected, is calculated and output.

More specifically, the predictive traction control may be implemented in the following three steps.

First, a target vehicle speed may be calculated based on a current vehicle speed (step S40).

Target vehicle speed=current vehicle speed+function [vehicle speed,opening degree of accelerator pedal,torque increase rate for each driving mode (normal,sport,eco,etc.),distribution ratio for each driving motor] [Equation 2]

Next, target driving motor speed may be calculated based on the calculated target vehicle speed (step S50).

Target driving motor speed=target vehicle speed× function[reduction ratio,speed reducer efficiency] [Equation 3]

Finally, the calculated target driving motor speed is transmitted to target driving motor torque calculating unit 40 using communication within the controller, or the like, when a communication network of the vehicle or a predictive control unit 30 and target driving motor torque calculating unit 40 are in the same controller (step S60).

Meanwhile, while the predictive traction control is being performed, the predictive control unit 30 may terminate predictive traction control if any one of the following conditions are satisfied (step S70).

For example, when the driver depresses an accelerator pedal so that the opening degree of the accelerator pedal is smaller than a second reference value, the predictive traction control may be terminated. Here, the second reference value of the opening degree is smaller than a first reference value at the time of entry.

Alternatively, the predictive traction control may be performed for a specific time period (several seconds to several tens of seconds) or longer and then terminated.

Alternatively, even when a portion of the above conditions are satisfied and the existing traction control attempts to enter, the predictive traction control may be terminated.

However, a termination condition of the predictive traction control is not necessarily limited to the above-described examples, and any other suitable condition may be added or changed.

As described above, in the predictive traction control method according to an embodiment of the present disclosure, an entry of predictive traction control may be determined by using information on road surface conditions of a front side of the vehicle, a signal transmitted from a wheel speed sensor, or the like may be monitored to estimate a vehicle speed, and target driving motor speed may be appropriately controlled to perform traction control so that the vehicle can stably travel.

Figure 3B:
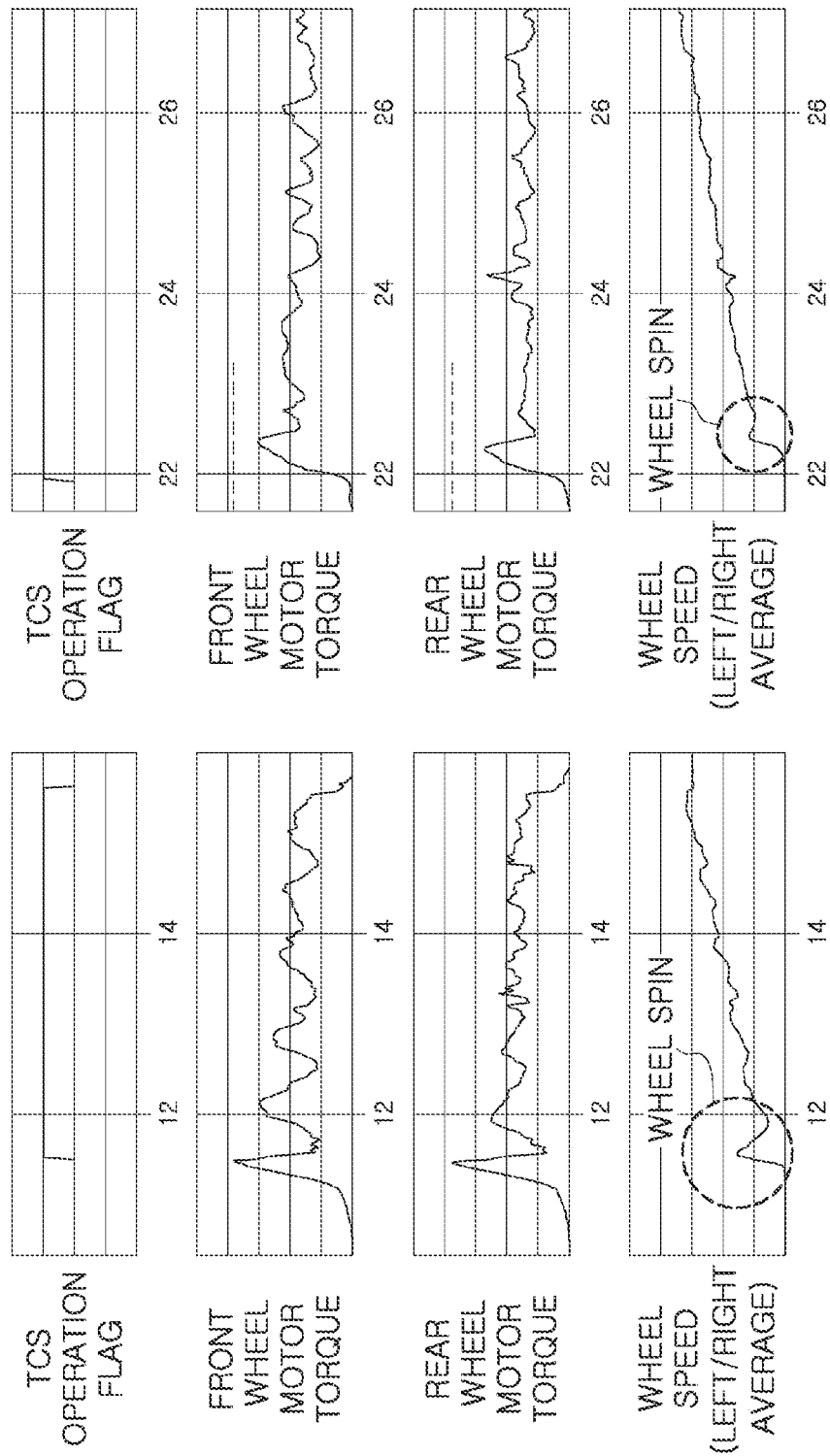
FIG. 3B is a graph illustrating a torque and wheel speed of a driving motor according to time during traction control according to the present disclosure.

FIG. 3A is a graph illustrating a torque and wheel speed of the driving motor according to time during traction control of the related art. FIG. 3B is a graph illustrating a torque and wheel speed of the driving motor according to time during traction control of the present disclosure.

In FIG. 3A, when wheel spin amount is equal to or greater than a reference value, traction control is entered. As described above, since traction control is entered after wheel spin occurs, there is a disadvantage in that an initial wheel spin amount increases as a road surface becomes slippery.

In FIG. 3B, by entering traction control early based on information on road surface conditions before wheel spin occurs, wheel spin may be minimized.

In the predictive traction control of the present disclosure, when it is determined that the road surface is slippery, since it already enters into the traction control at an initial stage of acceleration, there is an advantage of suppressing wheel spin and implementing a linear start.

Moreover, when the predictive traction control of the present disclosure is applied, it can be seen that traction control is performed at a value at which a maximum front wheel motor torque and a maximum rear wheel motor torque are significantly lower than a maximum front wheel motor torque and a maximum rear wheel motor torque of the conventional traction control.

As described above, according to an embodiment of the present disclosure, wheel spin may be suppressed by early performing traction control using information on road surface conditions before wheel spin occurs, and a large torque in a low-speed region may be output, thereby obtaining an effect of improving driving safety and marketability of the vehicle.

While the example embodiments have been illustrated and described above, it will be apparent to those skilled in the art that modifications and variations could be made without departing from the scope of the present disclosure as defined by the appended claims.

What is claimed is:

1. A predictive traction control method, comprising:
    determining, by a predictive control unit, whether predictive traction control is being performed;
    detecting, by a road surface conditions information providing unit, an upstream road surface condition in a travelling direction of a vehicle driven by a driving motor;
    in response to the determination, by the predictive control unit, that the predictive traction control has not been entered;
    determining, by the predictive control unit, whether to accelerate the vehicle according to a driver's will when the upstream road surface condition is determined to be slippery;
    calculating, by the predictive control unit, target driving motor speed for controlling the driving motor and transmitting the same, when the vehicle is accelerating;
    utilizing, by a target driving motor torque calculating unit, the target driving motor speed to calculate a target driving motor torque for controlling the driving motor; and
    controlling, by a driving motor control unit, based on the calculated target driving motor torque, a current applied to the driving motor.

2. The predictive traction control method of claim 1, wherein the detecting of the upstream road surface condition includes at least one of detecting, by the road surface conditions information providing unit, the upstream road surface condition through a camera or a sensor, estimating, by the road surface conditions information providing unit, the upstream road surface condition based on sensed weather information, and obtaining, by a navigation module or a communication module, information on a road surface from an external server.

3. The predictive traction control method of claim 1, wherein the determining of whether to accelerate the vehicle according to the driver's will includes confirming, by the predictive control unit, the driver's will to accelerate from a signal of an accelerator pedal sensor or a brake pedal sensor of the vehicle.

4. The predictive traction control method of claim 1, wherein the calculating and transmitting of the target driving motor speed comprises,
    calculating, by the predictive control unit, a target vehicle speed corresponding to information on a speed of the vehicle, an opening degree of an accelerator pedal, and a distribution ratio for each driving motor; and
    calculating, by the predictive control unit, the target driving motor speed to which a reduction ratio and a speed reducer efficiency are reflected based on the target vehicle speed.

5. The predictive traction control method of claim 1, further comprising terminating, by the predictive control unit, the predictive traction control method when a driver depresses an accelerator pedal so that an opening degree of the accelerator pedal is smaller than a predetermined reference value, when predictive traction control is performed to a specific time or longer, or when existing traction control attempts to enter traction control.

* * * * *